Aug. 19, 1958 — G. R. BELL — 2,848,021
POWER SAW WORK HOLD-DOWN ATTACHMENT
Filed Oct. 16, 1956
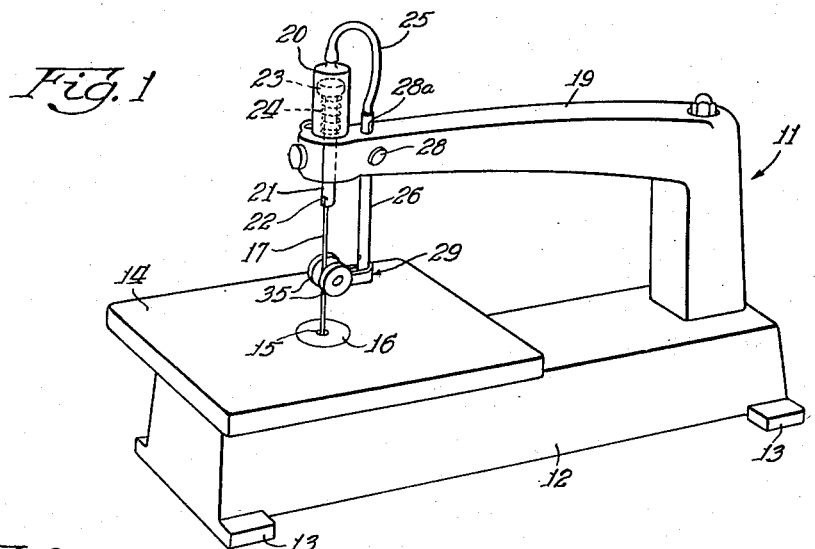
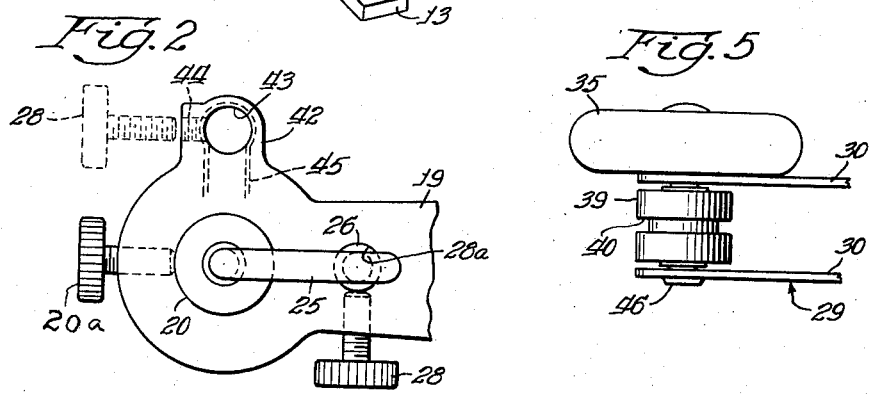
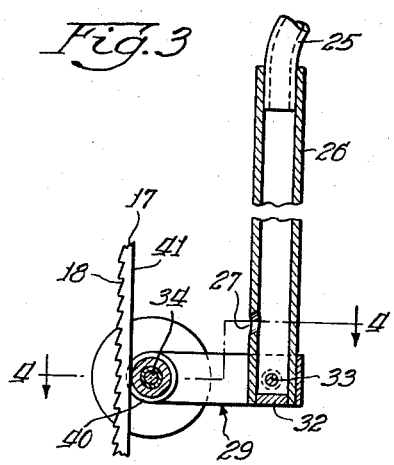
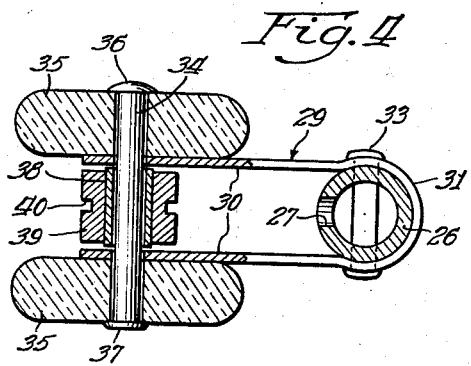
Inventor:
George R. Bell
By: Jones, Danks & Robertson
Attys.

United States Patent Office 2,848,021
Patented Aug. 19, 1958

2,848,021

POWER SAW WORK HOLD-DOWN ATTACHMENT

George R. Bell, Glenview, Ill., assignor to Burgess Vibrocrafters, Inc., Grayslake, Ill., a corporation of Delaware Application October 16, 1956, Serial No. 616,257

3 Claims. (Cl. 143—167)

This invention relates to power saw attachment more particularly for jig saws, saber jaws, band saws, and the like, in the use of which it has generally been experienced that the work being cut and the blade doing the cutting are subjected to chattering, that appreciably shortens the life of the blade and often results in erroneous cuts.

An object of the invention is the provision of a hold-down attachment for holding down the work that includes a rotatable wheel to press upon the work without marring the work.

Another object of the invention is the provision of a bracket for the hold-down wheel, or wheels, if desired, that carries also a guide roller for the saw blade.

Another object of the invention is the combination of the bracket previously referred to with a blower tube so that the blower tube constitutes a support for the bracket, thus minimizing parts while maximizing the efficiency of both the blower and the hold-down and blade guide.

In still another aspect, the invention contemplates an improved blade over-arm arrangement whereby the hold-down wheel axle may be alternatively located either transversely to the plane of the arm or in said plane, thus affording adaptation to work of different sizes requiring different directions of progress through the saw.

These and other objects will be apparent from the following detailed description, taken together with the accompanying drawings, of an illustrative embodiment of the invention, and in which drawings—

Figure 1 is a perspective view showing a jig saw having the present invention applied thereto;

Figure 2 is an enlarged fragmentary plan view of the outer end of the over-arm;

Figure 3 is a fragmentary vertical sectional view of the blower tube and bracket and also showing the blade;

Figure 4 is an enlarged plan section taken on the staggered line 4—4 of Fig. 3 but omitting the blade; and Figure 5 shows a modification.

Referring in detail to the illustrative construction shown in the drawing, the jig saw 11, to which the invention is here shown adapted, has a base 12 by which it may rest on a work bench or the like and being shown flared at each end as at 13 for enhanced stability, and the base having integral therewith a flat work table 14 with a central perforation 15 margined by a table insert 16, through which perforation 15 passes the blade 17 of a saw that in this instance is shown in the form of a jig saw, the blade 17 being of thin flexible metal having the saw teeth 18 on one edge thereof. The blade 17 at its lower end, as need not be here shown, may be connected with the usual output shaft of an electric motor suitably housed in the base 12, the latter being provided with an electric current plug-in device as is well known, the blade 17 being thus caused to reciprocate vertically in the opening 15. Also as is well known, the over-arm 19 is provided with a cylinder 20 at its upper end from which depends, below the arm 19, a plunger 21 to which the blade 17 is attached as at 22. The plunger 21 may act somewhat as a piston rod for a piston 23 that is pulled downwardly by the plunger 21, on every downward stroke of the blade 17, and is retracted upwardly, during the upward stroke of the blade, by a spring 24, the piston 23 thus forcing air, entrained in the upper part of the cylinder, through the air hose 25 and downwardly through the air tube 26 that is provided at its lower end with air outlet or vent 27 (Fig. 3) by which air under pressure is directed toward the opening 15 to blow away saw dust or cuttings off the table in the vicinity of the blade. Tube 26 passes through hole 28a in the over-arm and is held adjustably therein by set-screw 28. Cylinder 20 is held in the over-arm by set screw 20a (Fig. 2).

Turning now to the expedients of the present invention, and in accordance therewith as here illustrated, the air tube 26 at its lower end is arranged to constitute a rod-like support for the bracket 29 here shown in the form of a clevis having the pair of parallel legs 30 and the partially cylindrical bight 31, the bracket extending laterally from the tube. The bight 31 rigidly embraces the air tube 26 below the air vent 27, as best seen in Figs. 3 and 4, the lower end of the air tube 26 being closed by a plug 32, a rivet 33 passing through the bight 31 and through the tube 26 just above the plug 32 thus securing the bracket 29 rigidly to the air tube extending laterally therefrom.

Further in accordance with the present invention, at the outer end of the bracket legs 30 is an arbor 34 upon which is axled, as best seen in Fig. 4, a pair of wheels 35, a wheel 35 being on the outer side of each leg in this instance, the arbor 34 being conveniently in the form of a rivet having a head 36 abutting one of the wheels 35 on its outer face and being upset at its other end as at 37 to abut the other wheel 35 on its outer face. The wheels are rotatably carried on the bracket 29, and desirably may rotate independently of each other on the arbor 34, but with not too free movement.

Following the present invention, between the legs 30 of the bracket 29 is axled, on a bushing 38 that is sleeved on the arbor 34, a roller 39 having centrally therein an annular groove 40 that functions as a guide slot for the blade 17 in its reciprocating vertical movement, the smooth edge 41 of the blade being received in the groove 40. The guide roller 39 is free to turn, on the arbor 34, with the vertical movements of the blade, thus supporting and guiding the blade intermediate the point at its lower end where it is chucked in the base 12 and at its upper end where it is secured as at 22 to the plunger 21. The wheels 35 straddle the roller 39.

Advantageously, as here shown, the over-arm 19 is provided not only with the hole 28a for the air tube 26 but is also laterally enlarged as at 42 (Fig. 2) in which enlargement is another hole 43 that constitutes an alternative mounting means for the tube 26, the enlargement 42 being provided with a transverse intersecting threaded screw hole 44 into which the set screw 28 may be inserted to clamp the tube 26 in the hole 43 if that be desired, in which case, as suggested by the dotted lines 45, the bracket 29 will extend in a direction transverse to the plane of the over-arm 19, whereas, in Figure 1, the bracket 29 extends in the plane of the over-arm 19. This expedient makes it possible to place the work on the table 14 so that it will move either in the direction of or transversely of the over-arm, in which latter case it will be understood that the saw blade 17 is also rotated ninety degrees so as to be in said transverse plane, and so that the smooth edge 41 of the blade will still ride in the slot or groove 40 of the guide roller 39. In either case, air emerging from the air vent 27 under pressure is directed toward the blade adjacent the opening 15, the air vent 27 being desirably oriented downwardly as best seen in Fig. 3, for this purpose. When the tube 26 is located in hole 28a it will be understood that the arbor 34 is placed transversely to the plane of the over-arm 19 while when it is placed in hole 43 it is adjusted to be in the plane of the over-arm, one position being at right angles to the other.

So constructed and arranged, the wheels 35 may be lowered to press on the work carried on the table 14, by first loosening the set screw 28, dropping the tube 26 for that purpose, and then tightening the set screw. Thereupon the wheels 35 will rotate as the work moves while guarding against accidental displacement or chattering of the work. At the same time, whether the wheels be arranged to rotate in the plane of the over-arm or transversely thereto it is insured that the air vent 27 is always disposed in proper direction to serve its function. In either arrangement the wheels 35 are relatively close to the blade, and, by applying pressure on the work at each side of the blade further prevent chattering.

In the modification shown in Fig. 5 one of the wheels 35 is dispensed with, a slightly shorter rivet or arbor 46 being in that case employed. The use of the single wheel 35 on the bracket 29 may be availed of if it be desired to make it easier to see the cutting effect of the blade 17 on the work.

The rotatable wheels 35 avoid scoring or marring of the work, and if desired, as here suggested they may be of molded nylon or some such material having sufficient rigidity and good wearing qualities while at the same time having lubricous characteristics.

It is to be understood that the invention is not intended to be limited to all details of construction shown for purposes of exemplification, and an embodiment thereof having been described, pursuant to the statutes, such changes, including modifications or additions, may be made that fall within the scope of the appended claims without departing therefrom.

What is here claimed is:

1. A power saw attachment comprising a rod adapted to depend rigidly from the outer end of a saw over-arm, a clevis bracket rigidly mounted on said rod at the lower end thereof and having a pair of spaced parallel legs extending laterally from said rod, an axle mounted in the distal ends of said legs and extending therebetween and beyond each said leg of said bracket, a blade guide roller mounted for rotation upon said axle between said legs and having a blade-receiving annular groove on its outer surface, and a hold-down wheel rotatably mounted upon each end portion of said axle exteriorly adjacent said legs, said wheels being adapted to rigidly engage and hold down a work piece when in operative position.

2. An attachment in accordance with claim 1 wherein the rod is hollow to form an air tube and has an aperture forming a nozzle near the lower end thereof and adapted to direct a stream of air toward the vicinity of the saw cutting operation.

3. An attachment in accordance with claim 1 wherein the wheels are composed of nylon.

References Cited in the file of this patent

UNITED STATES PATENTS

| | | |
|---|---|---|
| 285,407 | Gratschel | Sept. 25, 1883 |
| 2,165,002 | Ocenasek | July 4, 1939 |
| 2,285,713 | Hedgpeth | June 9, 1942 |
| 2,453,899 | Gaines | Nov. 16, 1948 |
| 2,533,272 | Lyons | Dec. 12, 1950 |
| 2,542,524 | Hobbs | Feb. 20, 1951 |
| 2,609,016 | Bush | Sept. 2, 1952 |